Dec. 27, 1927.　　　　　　　　　　　　　　　　　1,654,060
J. S. WARBIS
AUTOMOBILE DIRECTION SIGNAL
Filed May 16, 1927　　　3 Sheets-Sheet 1
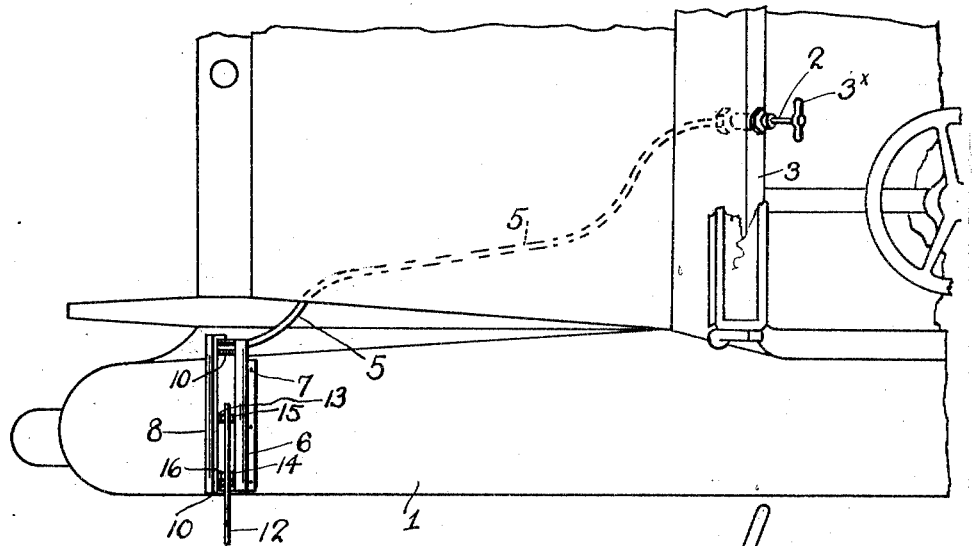
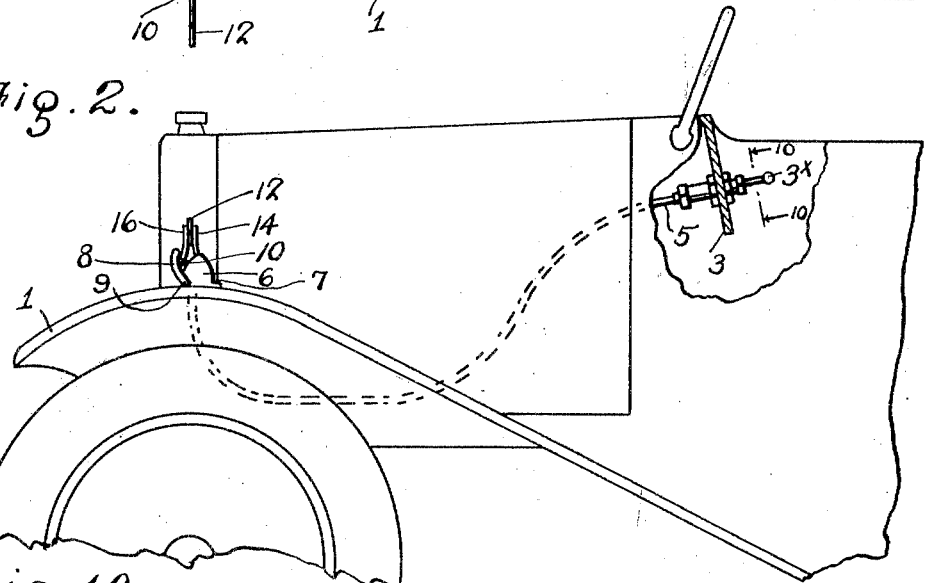
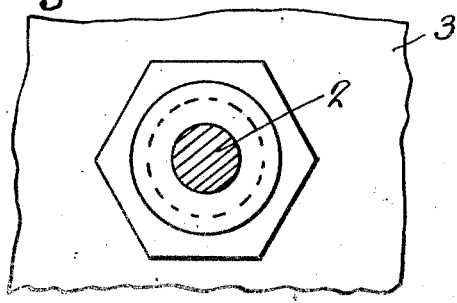
Inventor
Joseph S. Warbis
By Clarence A. O'Brien
Attorney Dec. 27, 1927. 1,654,060
J. S. WARBIS
AUTOMOBILE DIRECTION SIGNAL
Filed May 16, 1927 3 Sheets-Sheet 2
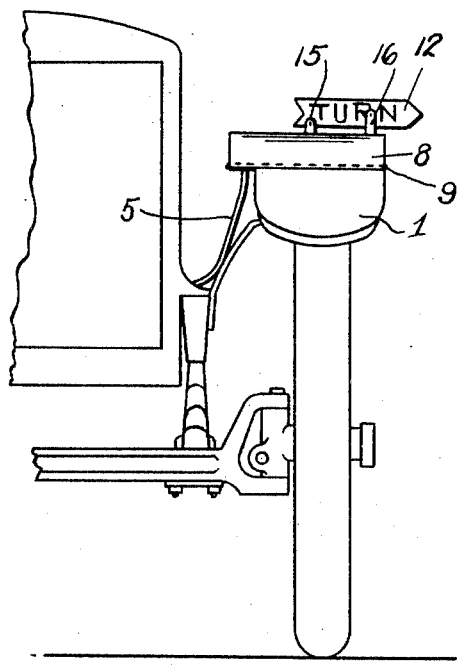
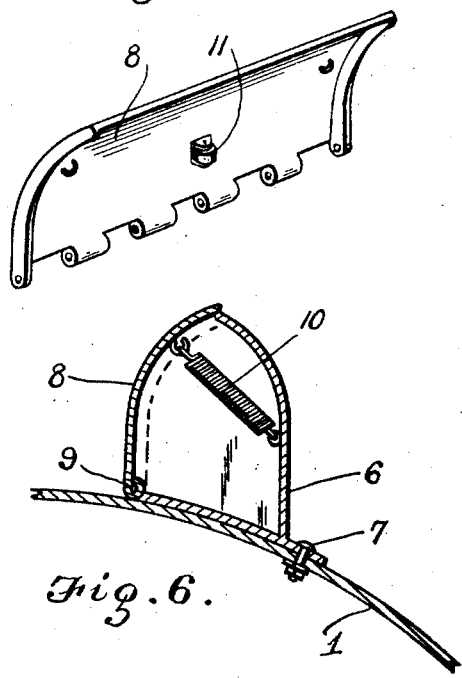
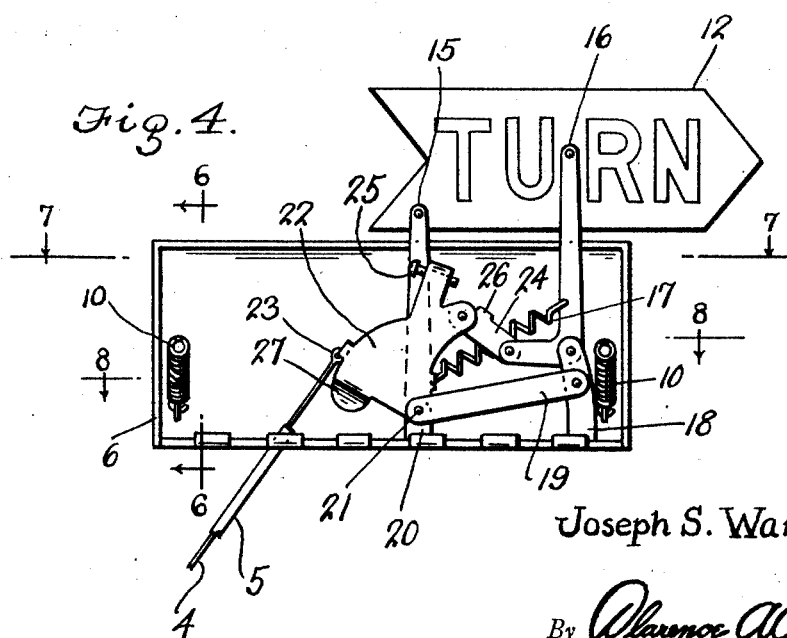
Inventor
Joseph S. Warbis
By Clarence A. O'Brien
Attorney Dec. 27, 1927.  
J. S. WARBIS  
1,654,060  
AUTOMOBILE DIRECTION SIGNAL  
Filed May 16, 1927  3 Sheets-Sheet 3
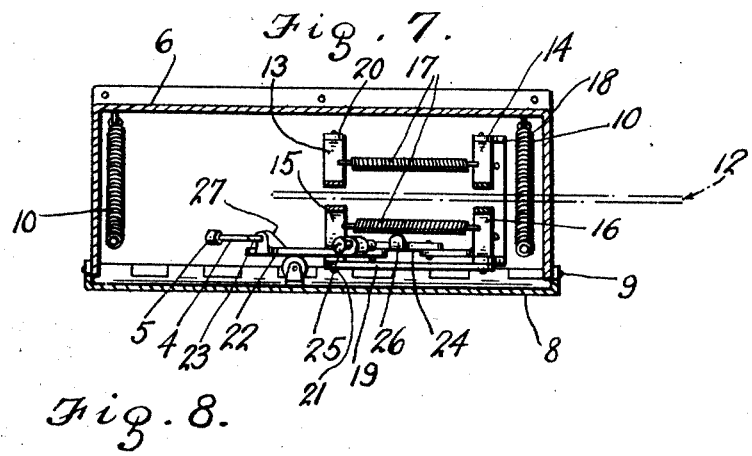
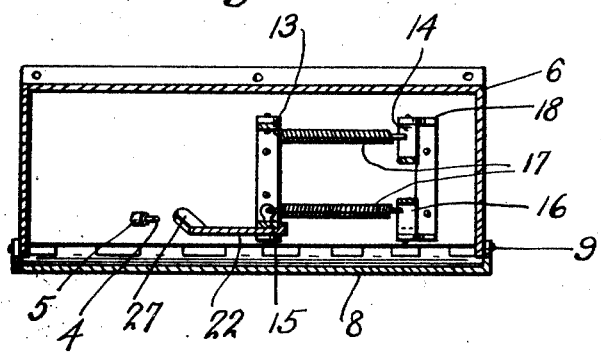
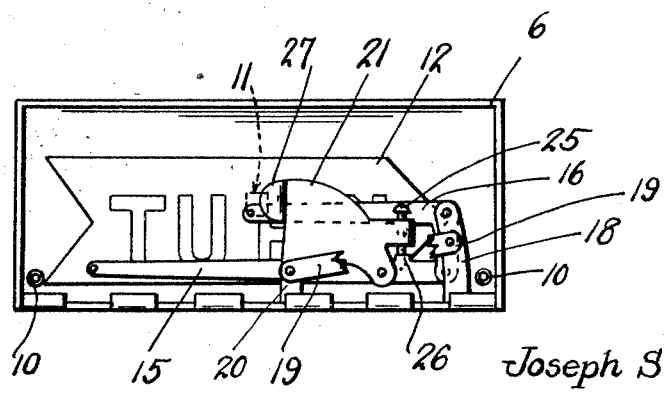
Inventor  
Joseph S. Warbis  
By *Clarence A. O'Brien*  
Attorney Patented Dec. 27, 1927.

1,654,060

UNITED STATES PATENT OFFICE.

JOSEPH S. WARBIS, OF RINARD, IOWA.

AUTOMOBILE DIRECTION SIGNAL.

Application filed May 16, 1927. Serial No. 191,737.

My present invention pertains to automobile direction signals; and it contemplates the provision of a peculiar and advantageous signal adapted to be expeditiously and easily operated by the driver of an automobile, and one characterized by the fact that when not in use, all of its parts are hidden from view and are adequately protected against injury and also against the action of the elements.

Other objects and practical advantages of the invention will be fully understood from the following description and claims when the same are read in connection with the drawings, accompanying and forming a part of this specification, in which:

Figure 1 is a plan view showing a portion of an automobile equipped with the preferred embodiment of my invention, and also showing the movable visual member of my improvement in position to indicate that the driver of the vehicle is about to make a turn.

Figure 2 is a side elevation of the same with a part broken away and the instrument board of the automobile in vertical section.

Figure 3 is a front elevation of the same.

Figure 4 is an enlarged elevation with the closing member of the casing comprised in my improvement removed and with the visual signal member in use.

Figure 5 is a perspective view of the closure member of the casing.

Figure 6 is a section showing the casing as closed, said section being taken in the plane indicated by the line 6—6 of Figure 4, looking toward the left.

Figures 7 and 8 are horizontal sections taken in the planes indicated by the line 7—7 and 8—8, respectively of Figure 4.

Figure 9 is a view similar to Figure 4, but showing the visual signal member as disposed out of use and entirely within the casing referred to.

Figure 10 is an enlarged detail section taken in the plane indicated by the line 10—10 of Figure 2 and illustrating the rectilinearly movable handle rod of my improvement.

Similar numerals of reference designate corresponding parts in all of the views of the drawings. The automobile illustrated is provided with a fender 1 and is otherwise of the ordinary well known construction.

The rectilinearly movable rod for the actuation of the visual signal member of my improvement is designated by 2 and is appropriately mounted and guided in the instrument board 3 of the automobile as will be readily understood from Figures 1, 2, and 10. Connected to the said rod 2 which has a handle 3 at its rear end, is a flexible rod 4, which is appropriately guided in a fixed tube 5, carried by the automobile.

Arranged crosswise on the automobile fender 1 is the casing of my improvement, the casing body designated by 6, being fixed to the fender at 7 and the closure member of the casing, designated by 8, being hingedly connected at 9, to the casing body 6 and being normally, though yieldingly maintained in closed position by end retractile springs 10, interposed between it and the casing body as illustrated in Figures 4, 6, and 7.

At its inner side the closure member 8 is provided with a roller 11, Figures 5 and 7, for use in the opening of the closure member 8, against the action of the spring 10, as will be hereinafter explicitly recited.

The visual signal member of my improvement is designated by 12 and it is shown in use in Figures 1, 2, 3, 4, and is shown out of use in Figure 9.

The said signal member is preferably, though not necessarily, shaped as illustrated, and it is provided at its opposite sides, by preference, with an appropriate legend, as "turn".

The said visual signal member 12 is movable from the idle position as shown in Figure 9 to the operative position shown in Figure 4, and vice versa, and it will be manifest that when the member 12 is in the position shown in Figure 9, it will be entirely hidden from view and together with certain other parts of the mechanism will be entirely hidden from view and at the same time will be protected against the elements. When, however, the member 12 is moved to the position shown in Figure 4, for instance, the signal member 12 will be in full view of persons in front of and in rear of the automobile and hence will be apprised of the intention of the driver to make a turn.

The signal member 12, in the preferred embodiment of my invention is carried by three swingable members 13, 14, and 15, and by a fourth swingable member 16, all of the said swingable members being pivotally connected to the signal member 12 and being also pivotally connected and supported in the casing body 6, and one of the swingable members, that is, the member 16, being in the form of bell crank, as best shown in Figure 4.

Arranged in the casing body 6 and connected to the swingable members 14 and 16 are retractile springs 17. These retractile springs 17 are tensioned when the signal member 12 and the swingable members 13, 14, 15 and 16 are positioned as shown in Figure 4, and consequently, the said springs 17 will operate to assist in the movement of the signal member 12, from the position shown in Figure 4 to the position shown in Figure 9. The swingable members 14 and 16 are carried by standards 18, and a brace 19 is preferably interposed between one of the standards 18 and the standard 20, to which latter is pivoted, at 21, a swingable member 22, which is connected, at 23, to the rod 4, and is adapted, when moved from the position shown in Figure 9, to that shown in Figure 4, to move the swingable members 13, 14. 15 and 16, and the visual signal member 12 to the positions shown in Figure 4. On reverse movement of the said swingable member 21, the parts indicated will be returned to the position shown in Figure 9. It will also be understood that on the movement of the member 21 from the position shown in Figure 9 to that shown in Figure 4, the member 21 will operate to open the closure member 8 so as to permit of the projection between the casing body 6 and the closure member 8 of the signal member 12 and the swingable members 13, 14, 15 and 16, while when the said parts are returned to the position shown in Figure 9, the springs 10 will operate to promptly close the member 8 for the adequate protection of the parts enclosed in the casing. The member 21 is connected by a link 24, with the bell crank swingable member 15, Figure 4, and by virtue of said connection, movement of the several swingable members 13, 14, 15 and 16 will attend the swinging movement of the member 22, for the described movements of the signal member 12. It will also be understood from Figure 4 that the member 22 is provided with a screw 25, adjustable in the member 22 and designed to bring up against an abutment 26, on the link 24, so as to prevent too great movement of the member 22 in one direction. At 27, the member 22 is provided with a deflected padlike portion, which when the member 22 is moved from the position shown in Figure 9, to that shown in Figure 4, is designed to cooperate with the roller 11 on the closure member 8, and thereby bring about the opening of the member 8 to an extent sufficient for the protection of the signal member 12 and the several swingable members 13, 14, 15 and 16.

It will be apparent, from the foregoing, that all movements of the member 22, in the casing are affected by endwise movement of the rod 4, and consequently it will be understood that the driver of the automobile is enabled to readily move the member 12 out of the position shown in Figure 9 to the active position shown in Figure 4, and quickly and easily move the member 12 from the active position shown in Figure 4 to the idle position shown in Figure 9.

Manifestly, when the movable parts are positioned as shown in Figure 9 and the closure member 8 is completely closed, the moving parts will be entirely hidden from view and will be protected from the elements to such an extent that the usefulness of the said parts will be materially prolonged. It will also be appreciated that the visual signal member 12 will never be in view, except when the driver of the automobile is desirous of apprising persons in front and rear of his automobile, of his intention to make a turn, and that because of this fact the visual signal member 12 in use will be more likely to attract attention thereto.

It will further be apparent from the foregoing that my improvement particularly the casing thereof, is embellished in a manner corresponding to the embellishment of the fender on which the casing is mounted and that therefore the improvement is calculated to enhance, rather than detract from the finished appearance of the automobile.

I have entered into a detailed description of the construction and relative arrangement of the parts embraced in the present and preferred embodiment of my invention, in order to impart a full, clear and exact understanding of the said embodiment. I do not desire, however, to be understood as limiting myself to the construction and relative arrangement herein disclosed, my invention being defined in my appended claims, within the scope of which modifications may be made, without departure from my invention.

I claim:

1. In combination, an automobile, a rectilinearly movable handle located in the body of the automobile, a casing arranged crosswise of the automobile on the exterior portion thereof and including a body and a closure member movable relatively to the body and lengthwise of the automobile, and means for closing said closure member, a visual signal movable in the direction of its length and crosswise of the automobile to and from a position in the casing, movable means in the casing for moving the said signal member and for opening said closure member, and a connection between the rectilinearly movable handle and the said signal moving and closure member opening means for actuating the latter by the former.

2. In combination, a casing body, a closure member hingedly connected thereto, retractile spring means interposed between and connected to the casing body and the closure member, a roller on the closure member, and swingable elements mounted in the casing body and arranged to extend therefrom and be enclosed therein, a visual signal member carried by said swingable members, an additional swinagable member mounted in the casing body and connected with the first named swingable members and having a cam portion for cooperation with the roller of the closure member, and an endwise movable rod movable relatively to the casing body and connected to the cam bearing swingable member.

3. In combination, a casing body, a closure member hingedly connected to the body and adapted when closed to be opposed to a portion thereof, retractile spring means interposed between and connected to the casing body and said closure member, swingable elements mounted in the casing body and movable alongside the body portion to which the closure member is opposed, a visual signal member carried by said swingable members and movable outwardly and inwardly and endwise through the space between the closure member and the portion of the body to which the closure member is opposed, a projection on the closure member at the inner side thereof, an additional swingable member mounted in the casing body and connected with the first named swingable members and having a cam portion for use in opposition to said projection on the closure member, and a handle connected to said cam bearing swingable member.

In testimony whereof I affix my signature.

JOSEPH S. WARBIS.